United States Patent [19]

Taylor

[11] 4,196,797
[45] Apr. 8, 1980

[54] BRAKING APPARATUS AND CONTROL

[75] Inventor: David B. Taylor, Lower Broadheath, England

[73] Assignee: Dowty Meco Limited, Worcester, England

[21] Appl. No.: 883,947

[22] Filed: Mar. 6, 1978

[30] Foreign Application Priority Data

Mar. 12, 1977 [GB] United Kingdom ............... 10553/77

[51] Int. Cl.² .............................................. B60K 41/20
[52] U.S. Cl. .......................................... 192/2; 192/7; 188/171; 188/181 T
[58] Field of Search ...................... 198/854, 855, 856; 192/7 R, 8 R, 2; 188/181 T, 171, 205, 134, 75, 170

[56] References Cited

U.S. PATENT DOCUMENTS 2,945,572   7/1960   Rye ...................................... 192/8 R

FOREIGN PATENT DOCUMENTS 620488    5/1961   Canada ........................................ 188/75
1135401   1/1966   United Kingdom .

*Primary Examiner*—C. J. Husar
*Assistant Examiner*—David C. Reichard
*Attorney, Agent, or Firm*—Young & Thompson

[57] ABSTRACT

A braking apparatus for a rotary shaft connected to a load comprising brake shoe means for the shaft capable of limited angular movement about the shaft axis to cause release of the brake shoe means from a brake applied condition during application of starting torque to the shaft, and stop means operable during application of the brake shoe means to bring the shaft to rest, for preventing or reducing said limited angular movement. In this way the limited angular movement is eliminated during braking of the shaft to bring it to rest, whereby to provide substantially smooth braking, particularly when the shaft is operative on a load such as a conveyor having a long conveying belt.

11 Claims, 3 Drawing Figures

BRAKING APPARATUS AND CONTROL

This invention relates to braking apparatus particularly, although not exclusively, intended for use with a belt conveyor, arranged to convey loose material up an incline.

The present invention comprises braking apparatus for a rotary shaft connected to a load having a brake shoe means capable of limited angular movement about the shaft axis to cause release of the brake shoe means from a brake-applied condition during application of starting torque to the shaft, and stop means, operable during application of the brake shoe means to bring the shaft to rest, for preventing or reducing said limited angular movement.

One embodiment of this invention comprises a braking apparatus for a rotary shaft connected to a load comprising brake shoe means for frictionally engaging the shaft or a part rotating therewith, a mounting means for the brake shoe means permitting limited angular movement of the brake shoe means about the shaft axis, stop means carried by the mounting means capable of reducing or preventing the amount of permitted angular movement of the brake shoe means, brake shoe release means responsive to angular movement of the brake shoe means within said limited angular movement to release the brake shoe means, and control means for the stop means operative to ensure:

(a) that during operation of the brake shoe means to bring the shaft to rest the said stop means is made effective to reduce or prevent said limited angular movement, (b) that during application of driving torque to the shaft to start it from rest the stop means is made ineffective, thus permitting movement of the brake shoe means with the shaft over said limited angular movement to cause release of the brake shoe means.

The stop means may comprise a hydraulic piston and cylinder unit connected to a source of liquid under pressure and arranged so that the limited angular movement of the brake shoe means may take place against the force exerted by the pressure within the piston and cylinder unit.

A non-return valve may be provided in the connection from the source of liquid under pressure to prevent return flow of liquid from the stop means to the source to ensure that the angular movement of the brake shoe means is prevented or reduced.

A solenoid operated valve may be connected to vent said stop means when energised, and interconnecting means may ensure energisation of the solenoid operated valve when starting torque is applied to the shaft.

Starting torque may be applied to the shaft from a motor through a hydrodynamic clutch.

The brake shoe means may be mounted on a carrier which, in turn, is mounted on a fixed base for said limited angular movement.

One embodiment of the invention will now be described with reference to the accompanying drawings, in which.

Figure 2:
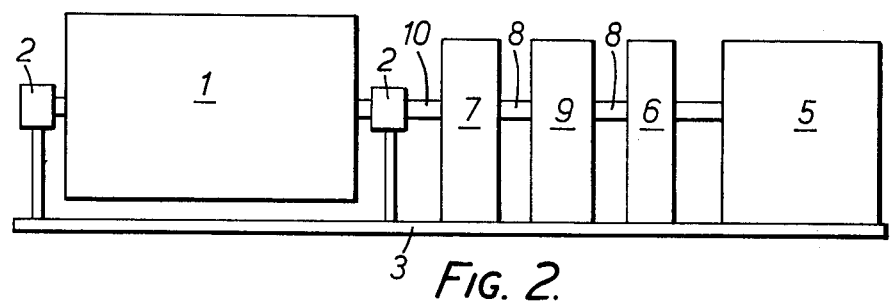
FIG. 2 is a diagrammatic illustration of the braking apparatus and driving apparatus for the driving drum of a belt conveyor, and, FIG. 3 is a simplified electric circuit diagram for use with the apparatus of FIGS. 1 and 2.

Referring initially to FIG. 2, a belt driving drum 1 is mounted within bearings 2 carried by a base 3, the belt engaging the drum extending from the drum to a conventional belt conveyor arranged for conveying the loose material, such as coal, up an incline.

Driving power for the drum 1 is applied by an electric motor 5 which drives through a hydrodynamic clutch 6 and a reduction gear box 7. The shaft 8 extending from the hydrodynamic clutch 6 passes through a braking apparatus 9 which thus operates on the input to the reduction gear box 7. The output shaft 10 from the reduction gear box drives the drum 1. The braking apparatus 9 will now be described in greater detail with reference to FIG. 1.

Figure 1:
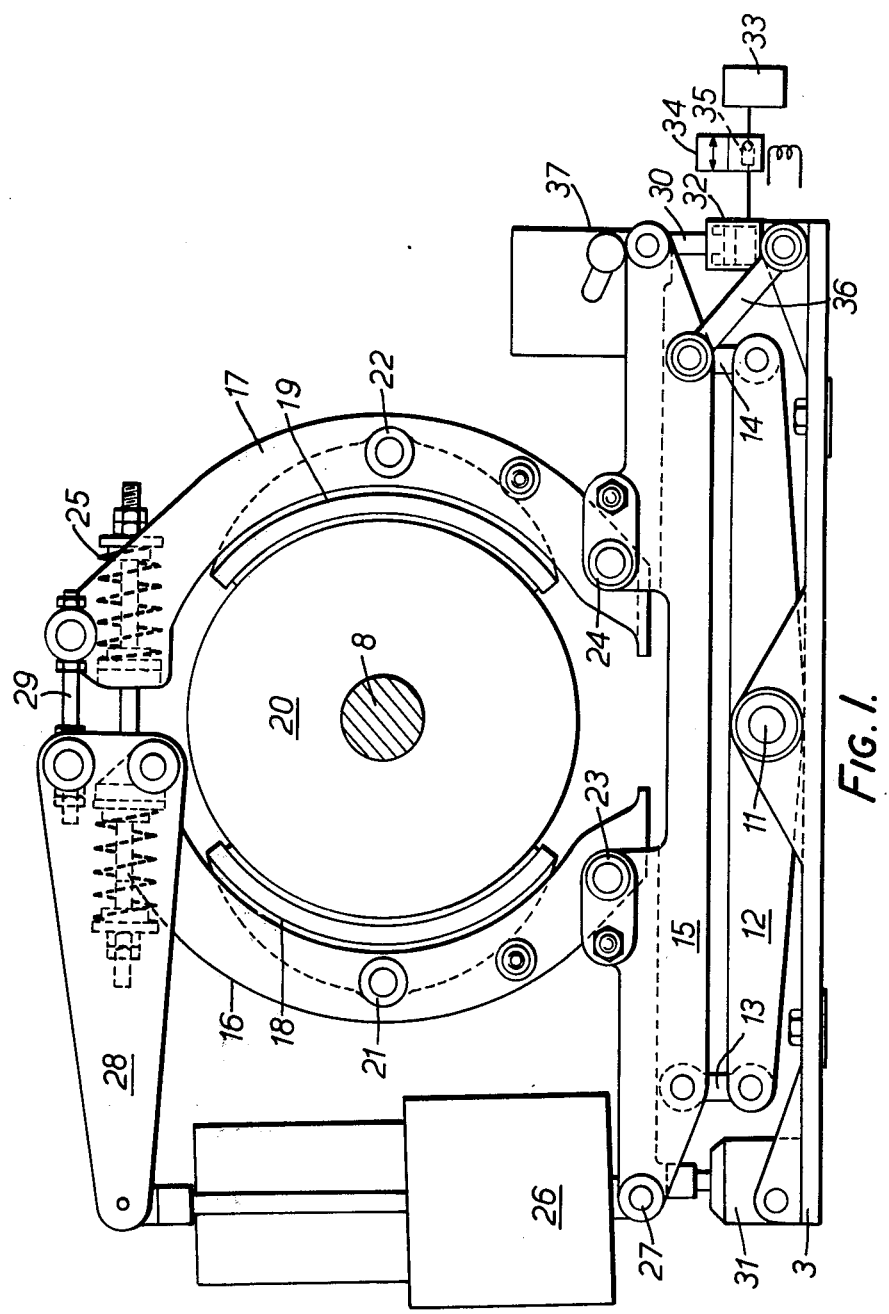
FIG. 1 is an elevation of the braking apparatus.

Within FIG. 1 the base 3 has a central pivotal mounting 11 on which the beam 12 is centrally mounted. From the ends of the beam 12 a pair of links 13 and 14 extend upwardly for connection to a brake carrier 15, also in the form of a beam. The pivotal connections of the links 13 and 14 in the beam 12 and in the carrier 15 are by means of elastically bushed pivot joints.

On the carrier 15 a pair of brake shoe mountings 16 and 17 are pivotally mounted, each being of part-circular form and each mounting a brake shoe respectively 18 and 19 by means of pivots 21 and 22. The brake shoes 18 and 19 operate on a rotor in the form of a brake drum 20 carried by the shaft 8. The mountings 16 and 17 are secured by pivots 23 and 24 on the carrier 15. The free ends of the mountings, 16 and 17, are urged together by a nest of springs 25, the springs being of such strength as to cause the shoes 18 and 19 to engage the rotor 20 and to frictionally lock the drum 1 against rotation.

For the purpose of releasing the brake, a thrustor 26 is mounted at pivot 27 on the carrier 15 and extends upwardly to engage a lever 28. Lever 28 is connected by means of a toggle link 29 between the two free ends of the mountings 16 and 17, such that upward thrust by the thrustor 26 on the lever 28 will urge the mountings 16 and 17 apart against the load of the springs 25 to release the brake.

The thrustor is of any conventional construction and in the described embodiment it comprises a hydraulic ram supplied with liquid at pressure from a pump driven by an electric motor. Switching on of the motor drives the pump to cause the thrust to be exerted. Cutting off the electric current from the motor will stop the pump and the thrustor then retracts, allowing the brake to be applied.

The brake shoe means is effectively the carrier 15, the mountings 16 and 17, the brake shoes 18 and 19, the spring loading 25 and the thrustor 26. To limit the angular movement of the brake shoe means in the anti-clockwise sense, an adjustable stop 31 is formed at one end of the base 3 to act on one end of the carrier 15. At the opposite end of the base a hydraulic stop 30 is formed by the piston rod of a piston and cylinder unit 32, acting upwardly on the carrier 15 to urge the brake shoe means about the pivot 11 onto stop 31. The piston and cylinder unit 32 is fed liquid at pressure from accumulator 33 through a solenoid operated selector valve 34. In the non-energised position of the valve 34 a non-return valve 35 is in circuit with the supply from the accumulator to ensure that liquid can flow only into the unit 32. When solenoid 34 is energised the unit 32 is connected directly to the accumulator 33. The cylinder of unit 32 limits the angular movement of the brake shoe means in the clockwise sense and with stop 31 defines the limited angular movement for the brake shoe means.

The stop 30, when unit 32 is fed with liquid at pressure through the non-return valve 35, effectively ensures that there can be no angular movement of the brake shoe means. It is, however, within the scope of the invention if the stop 30 is arranged to permit reduced angular movement of the brake shoe means, when the non-return valve 35 is operative.

A further link 36 extends from one end of the base 3 to the carrier 15, being connected at either end by an elastically bushed pivotal joint. The link 36 is arranged so that a straight line may be drawn through its pivotal axes and the centre of the shaft 8. The arrangement of the links 13, 14 and 36 and the lever 12 is such that the brake shoe means is capable of angular movement about the axis of shaft 8.

A limit switch 37 is arranged to respond to angular movement of the carrier 15.

Figure 3:
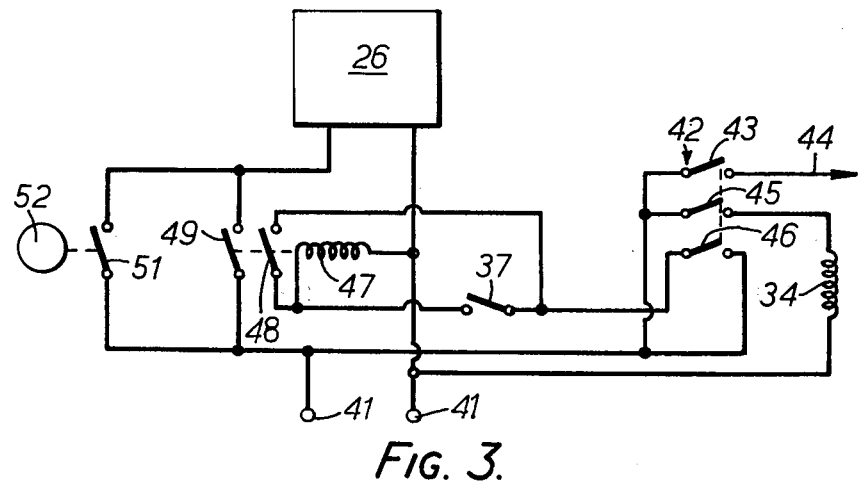

Reference is now made to FIG. 3 of the drawings showing a simplified control circuit. This control circuit is fed with electric power from an auxiliary source of electricity 41. In order to switch on electric power to the driving motor 5, a three-pole switch 42 is provided capable of completing one circuit from the source 41 through a first contact 43 and a conductor 44 to the starter of the motor 5. A second contact 45 of the switch 42 completes a circuit from the source 41 through the solenoid 34. A third contact 46 of switch 42 completes a circuit through the limit switch 37 and the solenoid of a relay 47. One contact 48 of relay 47 is closed when the relay is energised and is connected effectively in parallel with the limit switch 37 so that, when limit switch 37 closes, the contact 48 will also close and provide a self-energising circuit to maintain relay 47 energised. Relay 47, when energised, also closes a contact 49 to complete a circuit from the source 41 to the thrustor 26 and thereby to release the brake.

A further contact 51 is provided to complete a circuit from the source 41 to the thrustor 46, this contact being moved to the closed position by a centrifugal device 52 driven from the shaft 10 of drum 1. It is arranged that the centrifugal device 52 will close the contact 51 whwnever the drum speed exceeds 20 percent of its normal speed.

When the conveyor is in use the electric motor 5 will transmit power through clutch 6 and gear box 7 to rotate the drum 1 in the sense to drive the conveyor belt up an incline carrying loose material, such as coal. When it is necessary to stop the conveyor, electric current is switched off from the motor 5 by switch 42 and the conveyor is allowed to carry on moving under its own inertia until the speed drops to about 20 percent of its normal speed, at which point the centrifugal device 52 will open its contact 51 and cut off electricity from the thrustor 26, allowing the brake shoes 18 and 19 to engage rotor 23 to arrest the drum. During the period within which the brake is arresting the drum 1, the rotation of the rotor 20, as seen in FIG. 1, is in the clockwise direction and such thrust will tend to compress hydraulic liquid within the unit 32. However, the stop 30 will remain at its fixed outer position since liquid is prevented from escape by the non-return valve 35, the solenoid 34 being deenergised by the moving of switch 42 into the "off" position.

When it is necessary to re-start the conveyor, the switch 42 is operated to the "on" position and the motor starter is operated by current fed through conductor 44. The contact 45 will close the circuit through solenoid valve 34, which will then move to its second position to provide a direct hydraulic connection between unit 32 and accumulator 33. The motor will accelerate and increase in torque will be transmitted through the hydrodynamic clutch 6 and reduction gear box 7 to the drum 1 in the clockwise sense. The drum will not rotate until the driving torque exceeds the gravity and friction load exerted on the drum by the belt. When the drum eventually moves it will carry the brake shoe means with it, the carrier 15 operating to push the stop 30 into unit 32 and to displace liquid therefrom into accumulator 33 against accumulator pressure. Movement of the carrier 15 through the small angle will close the limit switch 37 and thus complete the circuit from contact 46 to relay 47. Closure of relay contact 48 will provide self-energisation for relay 47 to hold it closed and closure of relay contact 49 will complete a circuit from supply 41 to thrustor 26, so that it will release the brake, allowing the drum to rotate in the direction to propel the belt and loose material up the incline. Immediately the brake has released the pressure of liquid from accumulator 33 acting in unit 30 will urge the brake shoe means in the anti-clockwise sense onto the stop 31, opening the limit switch 37. However, the self-energising contact 48 will ensure that the electric supply is maintained to the thrustor 26. Immediately the conveyor belt speed rises above 20 percent of its normal speed the contact 51 will close, providing a further path parallel to contact 49 for the supply of electric current for the thrustor 26.

The advantage offered by the invention is that, during dynamic braking, i.e. bringing the drum and belt to rest, no angular movement of the brake shoe means is permitted, since the stop 30 acting on the carrier 15 will prevent any movement of the brake shoe means around the axis of shaft 8. Thus, dynamic braking is smooth and free from shudder. However, on restarting the conveyor, the limited angular movement of the brake shoe means is available to ensure that the driving torque to the conveyor drum must be greater than the static load exerted on the drum by the belt before the brake is released.

Whilst the described embodiment is intended for driving an upwardly inclined belt conveyor it will be appreciated that the braking apparatus described will have many uses, other than for a conveyor. For example, it may be used in the driving of a lift cage.

I claim:

1. Braking apparatus for a rotary shaft connected to a load, comprising brake shoe means for the shaft, driving means for the shaft, brake shoe mountings means permitting limited angular movement of the brake shoe means about the shaft axis, brake shoe release means operative to release the brake shoe means in response to both the application of driving torque to the shaft and limited angular movement of the brake shoe means, and stop means automatically operative, during application of the brake shoe means to bring the shaft to rest, for preventing or reducing, said limited angular movement.

2. Braking apparatus for a rotary shaft connected to a load comprising brake shoe means for frictionally engaging the shaft or a part rotating therewith, a mounting means for the brake shoe means permitting limited angular movement of the brake shoe means about the shaft axis, stop means carried by the mounting means capable of reducing or preventing the amount of permitted angular movement of the brake shoe means, brake shoe release means responsive to angular movement of the brake shoe means within said limited angular movement to release the brake shoe means and control means for the stop means operative to ensure:

(a) that during operation of the brake shoe means to bring the shaft to rest the said stop means is made effective to reduce or prevent said limited angular movement, (b) that during application of driving torque to the shaft to start it from rest, the stop means is made ineffective, thus permitting movement of the brake shoe means with the shaft over said limited angular movement to cause release of the brake shoe means.

3. Braking apparatus as claimed in claim 2, including a hydraulic piston and cylinder unit forming the stop means, a source of liquid under pressure connected to said hydraulic piston and cylinder unit and arranged so that the permitted angular movement of the brake shoe means may take place against the force exerted by the pressure in the piston and cylinder unit.

4. Braking apparatus as claimed in claim 3, including a non-return valve in the connection from the source of liquid under pressure to prevent return flow of liquid from the stop means to the source to ensure that angular movement of the brake shoe means is prevented or reduced.

5. Braking apparatus as claimed in claim 4, including a solenoid operated valve connected to said stop means and capable, when energised, of venting said stop means, and interconnecting means to ensure energisation of the solenoid operated valve when torque is applied to the shaft.

6. Braking apparatus as claimed in claim 2, including a motor and a hydrodynamic clutch arranged so that the motor can apply driving torque through the hydrodynamic clutch to the shaft.

7. Braking apparatus as claimed in claim 2, including a carrier for the brake shoe means and a fixed base on which said carrier is mounted for said limited angular movement.

8. Braking apparatus as claimed in claim 7, including a plurality of links pivotally connecting the carrier to the base and elastic bushes forming the pivots of the links.

9. Braking apparatus as claimed in claim 2, including spring loading for the brake shoe means to hold it in the brake applied condition and an electrically operated brake shoe release means which, when fed with electric current, will release the spring loading on the brake shoe means.

10. Braking apparatus as claimed in claim 9 wherein the brake shoe release means comprises an electrically operated thrustor, and including a limit switch responsive to said limited angular movement of the brake shoe means to energise the thrustor to release the brake shoe means.

11. Braking apparatus as claimed in claim 10, including an electric motor to supply torque to the shaft, switch means for simultaneously switching on the motor, disabling the stop means and preparing a circuit closeable by said limit switch to energise the thrustor to release the brake shoe means when the latter move through said limited angular movement.

* * * * *